United States Patent [19]

Chang et al.

[11] Patent Number: 4,897,781

[45] Date of Patent: Jan. 30, 1990

[54] SYSTEM AND METHOD FOR USING CACHED DATA AT A LOCAL NODE AFTER RE-OPENING A FILE AT A REMOTE NODE IN A DISTRIBUTED NETWORKING ENVIRONMENT

[75] Inventors: Albert Chang; Grover H. Neuman; Amal A. Shaheen-Gouda; Todd A. Smith, all of Austin, Tex.

[73] Assignee: International Business Machines Corporation, Armonk, N.Y.

[21] Appl. No.: 14,899

[22] Filed: Feb. 13, 1987

[51] Int. Cl.[4] .................. G06F 15/16; G06F 11/00
[52] U.S. Cl. ........................ 364/200; 364/222.81; 364/284.4; 364/285.4; 364/264; 364/300
[58] Field of Search ... 364/200 MS File, 900 MS File, 364/300

[56] References Cited

U.S. PATENT DOCUMENTS

| 4,432,057 | 2/1984 | Daniell et al. | 364/200 |
|---|---|---|---|
| 4,620,276 | 10/1986 | Daniell et al. | 364/200 |
| 4,635,189 | 1/1987 | Kendall | 364/200 |
| 4,686,620 | 11/1987 | Ng | 364/200 |
| 4,710,870 | 12/1987 | Blacknell et al. | 364/200 |
| 4,714,992 | 12/1987 | Gladney et al. | 364/200 |
| 4,714,995 | 12/1987 | Materna et al. | 364/200 |
| 4,714,996 | 12/1987 | Gladney et al. | 364/300 |
| 4,718,002 | 1/1988 | Carr | 364/200 |
| 4,718,005 | 1/1988 | Feigenbaum et al. | 364/200 |

OTHER PUBLICATIONS

Baird, "Sharing of Disk Files Without Locking", IBM TDB vol. 22, No. 7, Dec. 1979, pp. 2887-2889.
Serutchin et al., "Multi-Access Data Sharing Facility Utilizing Magnetic Bubble Storage", IBM, TDB, vol. 23, No. 8, Jan., 1981, pp. 3882-3885.
Rifkin et al., "RFS Architectural Overview", pp. 1-12.
Kleiman, S. R., "Vnodes: An Architecture for Multiple File System Types in Sun UNIX", pp. 238-247.
Sandberg, R. et al., "Design and Implementation of the Sun Network Filesystem", pp. 119-130.
Walsh, Dan et al., "Overview of the Sun Network File System", pp. 117-124.
Chang, JoMei, "Status Monitor Provides Network Locking Service for NFS", pp. 1-3.
Chang, JoMei, "SunNet", pp. 71-75.
Taylor, Bradley, "Secure Networking in the Sun Environment", pp. 28-36.
Hamilton, Richard et al., "An Administrator's View of Remote File Sharing", pp. 1-9.
Houghton, Tom et al., "File Systems Switch", pp. 1-2.
Olander, David J. et al., "A Framework for Networking in System V", pp. 1-8.

Primary Examiner—Thomas C. Lee
Attorney, Agent, or Firm—Marilyn D. Smith

[57] ABSTRACT

In a distributed environment several data processing systems are interconnected across a network system. A distributed services program installed on the systems in the network allows the processors to access data files distributed across the various nodes of the network without regard to the location of the data file in the network. The processing system accessing file, referred to as the client processing system, utilizes a client cache within its operating system to store the data file. Utilizing the client cache minimizes the number of reads and writes that must go over the network to the server processing system where the file physically resides. The system and method of this invention prevents a process in the client processing system from accessing data in the client cache that has been modified at another node in the network. The blocks of data in the client cache are tested for validity in the client processing system by using modification times as measured by the server processing system. If the cache data blocks are determined to be valid, the data blocks are determined to be invalid, the data blocks are discarded, and the file is accessed from the server processing system.

16 Claims, 11 Drawing Sheets

4,897,781

SYSTEM AND METHOD FOR USING CACHED DATA AT A LOCAL NODE AFTER RE-OPENING A FILE AT A REMOTE NODE IN A DISTRIBUTED NETWORKING ENVIRONMENT

CROSS REFERENCE TO RELATED APPLICATIONS

This application is related in subject matter to the following applications filed concurrently herewith and assigned to a common assignee:

Application Ser. No. 07/014,884, currently copending and filed by D. W. Johnson, L. W. Henson, A. A. Shaheen-Gouda, and T. A. Smith for Negotiating Communication Conventions Between Nodes In A Network, now abandoned.

Ser. No. 07/014,897, currently copending and filed by D. W. Johnson, G. H. Neuman, C. H. Sauer, A. A. Shaheen-Gouda, and T. A. Smith for A System And Method For Accessing Remote Files In A Distributed Networking Environment.

Application Ser. No. 07/014, currently copending and filed by D. W. Johnson, A. A. Shaheen-Gouda, T. A. Smith for Distributed File Access Structure Lock.

Application Ser. No. 07/014,891, curently copending and filed by L. W. Henson, A. A. Shaheen-Gouda, and T. A. Smith for File and Record Locking Between Nodes in A Distributed Data Processing Environment.

Application Ser. No. 07/014,892, currently copending and filed by D. W. Johnson, L. K. Loucks, C. H. Sauer, and T. A. Smith for Single System Image Uniquely Defining An Environment For Use In A Data Processing System.

Application Ser. No. 07/014,888, currently copending and filed by D. W. Johnson, L. K. Loucks, A. A. Shaheen-Gouda for Interprocess Communication Queue Location Transparency.

Application Ser. No. 07/014,889, currently copending and filed by D. W. Johnson, A. A. Shaheen-Gouda, and T. A. Smith for Directory Cache Management In a Distributed Data Processing System.

The disclosures of the foregoing co-pending applications are incorporated herein by reference.

DESCRIPTION

1. Field of the Invention

This invention relates to processing systems connected through a network, and more particularly to the accessing of files between local and remote processing systems in a distributed networking environment.

2. Background Art

As shown in FIG. 1, a distributed networking environment 1 consists of two or more nodes A, B, C, connected through a communication link or a network 3. The network 3 can be either a local area network (LAN), or a wide area network (WAN). The latter consists of switched or leased teleprocessing (TP) connections to other nodes, or to a systems network architecture (SNA) network of systems.

At any of the nodes A, B, C, there may be a processing system 10A, 10B, 10C, such as a personal computer. Each of these processing systems 10A, 10B, 10C, may be a single user system or a multi-user system with the ability to use the network 3 to access files located at a remote node. For example, the processing system 10A at local node A, is able to access the files 5B, 5C at the remote nodes B, C.

The problems encountered in accessing a file at a remote nodes can be better understood by first examining how a stand-alone system accesses files. In a standalone system, such as 10 as shown in FIG. 2, a local buffer 12 in the operating system 11 is used to buffer the data transferred between the permanent storage 2, such as a hard file or a disk in a personal computer, and the user address space 14. The local buffer 12 in the operating system 11 is also referred to as a local cache or kernel buffer.

In the standalone system, the kernel buffer 12 is identified by blocks 15 which are designated as device number, and logical block number within the device. When a read system call 16 is issued, it is issued with a file descriptor of the file 5, and a byte range within the file 5, as shown in step 101, FIG. 3. The operating system 11 takes this information and converts it to device number, and logical block numbers in the device, step 102, FIG. 3. Then the operating system 11 reads the cache 12 according to the device number and logical block numbers, step 103.

Any data read from the disk 2 is kept in the cache block 15 until the cache block 15 is needed. Consequently, any successive read requests from an application 4 that is running on the processing system 10 for the same data previously read is accessed from the cache 12 and not the disk 2. Reading from the cache is less time consuming than going out to the fixed disk 2, accessing the correct disk sectors, and reading from the disk.

Similarly, data written from the application 4 is not saved immediately on the disk 2, but is written to the cache 12. This saves disk accesses if another write operation is issued to the same block. Modified data blocks in the cache 12 are saved on the disk 2 periodically.

Another use of the local cache in a stand-alone system is to hold valid data for a file even after the file is closed. If the file is re-opened while these blocks still exist in the cache, then no disk access is required for reading the blocks.

Use of a cache in a standalone system that utilizes an AIX[1] (Advanced Interactive Executive) operating system improves the overall performance of the system since disk accessing is eliminated for successive reads and writes. Overall performance is enhanced because accessing permanent storage is slower and more expensive than accessing a cache.

[1]AIX is a trademark of IBM Corporation.

In a distributed environment, as shown in FIG. 1, there are two ways the processing system 10C in local node C could read the file 5A from node A. In one way, the processing system 10C could copy the whole file 5A, and then read it as if it were a local file 5C residing at node C. Reading a file in this way creates a problem if another processing system 10B, 10A at another node A, B modifies the file 5A after the file 5A has been copied at node C. The processing system 10C would not have access to these latest modifications to the file 5A.

Another way for processing system 10C to access a file 5A at node A is to read one block N1 at a time as the processing system at node C requires it. A problem with this method is that every read has to go across the network communication link 3 to the node A where the file resides. Sending the data for every successive read is time consuming.

Accessing files across a network presents two competing problems as illustrated above. One problem involves the time required to transmit data across the network for successive reads and writes. On the other hand, if the file data is stored in the node to reduce network traffic, the file integrity may be lost. For example, if one of the several nodes is also writing to the file, the other nodes accessing the file may not be accessing the latest updated file that has just been written. As such, the file integrity is lost since a node may be accessing incorrect and outdated files.

Within this document, the term "server" will be used to indicate the node where the file is permanently stored, and the term "client" will be used to mean any other node having processes accessing the file. It is to be understood, however, that the term "server" does not mean a dedicated server as that term is used in some local area network systems. The distributed services system in which the invention is implemented is a truly distributed system supporting a wide variety of applications running at different nodes in the system which may access files located anywhere in the system.

The invention to be described hereinafter was implemented in a version of the UNIX[2] operating system but may be used in other operating systems having characteristics similar to the UNIX operating system. The UNIX operating system was developed by Bell Telephone Laboratories, Inc., for use on a Digital Equipment Corporation (DEC) minicomputer but has become a popular operating system for a wide range of minicomputers and, more recently, microcomputers. One reason for this popularity is that the UNIX operating system is written in the C programming language, also developed at Bell Telephone Laboratories, rather than in assembly language so that it is not processor specific. Thus, compilers written for various machines to give them C capability make it possible to transport the UNIX operating system from one machine to another. Therefore, application programs written for the UNIX operating system environment are also portable from one machine to another. For more information on the UNIX operating system, the reader is referred to *UNIX TM System, User's Manual, System V*, published by Western Electric Co., January 1983. A good overview of the UNIX operating system is provided by Brian W. Kernighan and Rob Pike in their book entitled *The Unix Programming Environment*, published by Prentice-Hall (1984). A more detailed description of the design of the UNIX operating system is to be found in a book by Maurice J. Bach, *Design of the Unix Operating System*, published by Prentice-Hall (1986).

[2] Developed and licensed by AT&T. UNIX is a registered trademark of AT&T in the U.S.A. and other countries.

AT&T Bell Labs has licensed a number of parties to use the UNIX operating system, and there are now several versions available. The most current version from AT&T is version 5.2. Another version known as the Berkeley version of the UNIX operating system was developed by the University of California at Berkeley. Microsoft, the publisher of the popular MS-DOS and PC-DOS operating systems for personal computers, has a version known under their trademark as XENIX. With the announcement of the IBM RT PC[3] (RISC (reduced instruction set computer) Technology Personal Computer)) in 1985, IBM Corp. released a new operating system called AIX which is compatible at the application interface level with AT&T's UNIX operating system, version 5.2, and includes extensions to the UNIX operating system, version 5.2. For more description of the AIX operating system, the reader is referred to *AIX Operating System Technical Reference*, published by IBM Corp., First Edition (Nov. 1985).

[3] RT and RT PC are trademarks of IBM Corporation.

The invention is specifically concerned with distributed data processing systems characterized by a plurality of processors interconnected in a network. As actually implemented, the invention runs on a plurality of IBM RT PCs interconnected by IBM's Systems Network Architecture (SNA), and more specifically SNA LU 6.2 Advanced Program to Program Communication (APPC). *An Introduction To Advanced Program-To-Program Communication (APPC)*, Technical Bulletin by IBM International Systems Centers, July 1983, no. GG24-1584-0, and *IBM RT PC SNA Access Method Guide and Reference*, Aug. 15, 1986, are two documents that further describe SNA LU 6.2.

SNA uses as its link level Ethernet[4] a local area network (LAN) developed by Xerox Corp., or SDLC (Synchronous Data Link Control). A simplified description of local area networks including the Ethernet local area network may be found in a book by Larry E. Jordan and Bruce Churchill entitled *Communications and Networking for the IBM PC*, published by Robert J. Brady (a Prentice-Hall company) (1983). A more definitive description of communications systems for computers, particularly of SNA and SDLC, is to be found in a book by R. J. Cypser entitled *Communications Architecture for Distributed Systems*, published by Addison-Wesley (1978). It will, however, be understood that the invention may be implemented using other and different computers than the IBM RT PC interconnected by other networks than the Ethernet local area network or IBM's SNA.

[4] Ethernet is a trademark of Xerox Corporation.

As mentioned, the invention to be described hereinafter is directed to a distributed data processing system in a communication network. In this environment, each processor at a node in the network potentially may access all the files in the network no matter at which nodes the files may reside.

Other approaches to supporting a distributed data processing system in a UNIX operating system environment are known. For example, Sun Microsystems has released a Network File System (NFS) and Bell Laboratories has developed a Remote File System (RFS). The Sun Microsystems NFS has been described in a series of publications including S.R. Kleiman, "Vnodes: An Architecture for Multiple File System Types in Sun UNIX", *Conference Proceedings, USENIX* 1986 *Summer Technical Conference and Exhibition*, pp. 238 to 247; the Sun Network Filesystem", *Conference Proceedings, Usenix* 1985, pp. 119 to 130; Dan Walsh et al., "Overview of the Sun Network File System", pp. 117 to 124; JoMei Chang, "Status Monitor Provides Network Locking Service for NFS"; JoMei Chang, "SunNet", pp. 71 to 75; and Bradley Taylor, "Secure Networking in the Sun Environment", pp. 28 to 36. The AT&T RFS has also been described in a series of publications including Andrew P. Rifkin et al., "RFS Architectural Overview", *USENIX Conference Proceedings*, Atlanta, Georgia (June 1986), pp. 1 to 12; Richard Hamilton et al., "An Administrator's View of Remote File Sharing", pp. 1 to 9; Tom Houghton et al., "File Systems Switch", pp. 1 to 2; and David J. Olander et al., "A Framework for Networking in System V", pp. 1 to 8.

One feature of the distributed services system in which the subject invention is implemented which distinguishes it from the Sun Microsystems NFS, for example, is that Sun's approach was to design what is essentially a stateless machine. More specifically, the server in a distributed system may be designed to be stateless. This means that the server does not store any information about client nodes, including such information as which client nodes have a server file open, whether client processes have a file open in read—only or read—write modes, or whether a client has locks placed on byte ranges of the file. Such an implementation simplifies the design of the server because the server does not have to deal with error recovery situations which may arise when a client fails or goes off-line without properly informing the server that it is releasing its claim on server resources.

An entirely different approach was taken in the design of the distributed services system in which the present invention is implemented. More specifically, the distributed services system may be characterized as a "statefull implementation". A "statefull" server, such as that described here, does keep information about who is using its files and how the files are being used. This requires that the server have some way to detect the loss of contact with a client so that accumulated state information about that client can be discarded. The cache management strategies described here, however, cannot be implemented unless the server keeps such state information. The management of the cache is affected, as described below, by the number of client nodes which have issued requests to open a server file and the read/write modes of those opens.

SUMMARY OF THE INVENTION

It is therefore an object of this invention to improve the response time in accessing remote files.

It is a further object of this invention to maintain the file integrity in a distributed networking environment.

It is a further object to use a cache in both the server and client nodes to hold valid data when a file is closed in the client node.

To reduce the network traffic overhead when files at other nodes are accessed, and to preserve the file integrity, the accessing of the various files in a distributed networking environment are managed by file synchronization modes. A file is given a first synchronization mode if a file is open at only one node for either read or write access. A file is given a second synchronization mode if a file is opened for read only access at any node. A file is given a third synchronization mode if the file is open for read access in more than one node, and at least one node has the file open for write access.

If a file is in either the first or second synchronization mode, the client node, which is the node accessing the file, uses a cache within its operating system to store the file. All read and writes are then sent to this cache.

The system and method of this invention uses a cache in both the client and server nodes to hold valid data when a file is closed in the client node. Whether or not the client node reuses the client cache depends on whether or not the data in the client cache has been modified at another node during the time that the data file was closed at the client node. If the data has not been modified, the client cache can be accessed by reads and writes from processes in the client node without sacrificing file integrity. All data in the client cache is valid data. By using the client cache for access when a file has been opened after it had once been closed, network traffic overhead is reduced, and the read and write response time is decreased, thereby improving the response time.

To determine whether or not the data in the client cache has been modified at another node while the file was closed at the client node, the system of this invention comprises a surrogate inode in the client cache. The surrogate inode contains a field that identifies the server node, and also a file handle that identifies the file in that node. A surrogate inode is created in the client cache whenever the file is initially opened at a node, or is first opened after a last close. The last modification time of the file, as recorded by the server's clock, is written to the surrogate inode whenever a surrogate inode is created. The system of this invention also comprises a file modification time field in the cache data blocks that indicate the last modification time of the file at the server. The file modification time field in the cache data blocks are updated during the last close of the file at the client node.

The method of this invention comprises the following steps during the opening, reading, and closing of a file at a client node.

When an open for a file is issued in a client node, the surrogate inode table in the client processing system is scanned for an existing surrogate inode. If none exists, then a new surrogate inode is allocated and an open remote procedure call is sent to the server. When the open is complete at the server, the open acknowledgement from the server to the client will include the last modification time for the file. This time is recorded in the newly allocated surrogate inode for the file at the client node.

When new blocks of data of the file are read, a new cache block is allocated in the client cache. Each cache block contains the server node name, the file handle, and the last modification time from the surrogate inode.

When the file is opened for a second or subsequent time, and the surrogate inode table in the client processing system is scanned for an existing surrogate inode, a surrogate inode will already exist from a previous open. In this case, there is no change to the modification time, or to he surrogate inode. The last modification time on the data blocks are not changed with a second open, either.

During the last close of a file that is in ASYNCH mode, the following steps occur. First, the client sends a close to the server. Then, upon receiving the close request from the client, the server sends an acknowledgement of the close to the client. With the close acknowledgement, the server sends the last time that the file was modified to the client. The server may have to go to the disk at the server to get this last modification time. The client then deallocates the surrogate inode, and scans all of the remote cache buffers for blocks which have the server node name and file handle for the file being closed. The client then changes all of the last modification times in the corresponding cache blocks to the one received from the server with the close acknowledgement.

Whenever a block is being read from the client cache, the time in the surrogate inode is compared with the time in the cache data block. A time in the surrogate inode that is greater than the time in the cache data blocks indicates that the data in the client cache has been modified while the data file has been closed at the client node. In this case, the client node must go over the network to the server to get the last modified data. To maintain file integrity, all blocks of data for the file in the client cache must be invalidated.

A time in the surrogate inode that is the same time as recorded in the cache data blocks indicates that the data in the client cache is still valid. No other node has modified this data while the file was closed at the client node. In this case, processes within the client node can use the block of data in the client cache without going across the network to the server where the file actually resides.

DESCRIPTION OF THE PREFERRED EMBODIMENT

Figure 4:
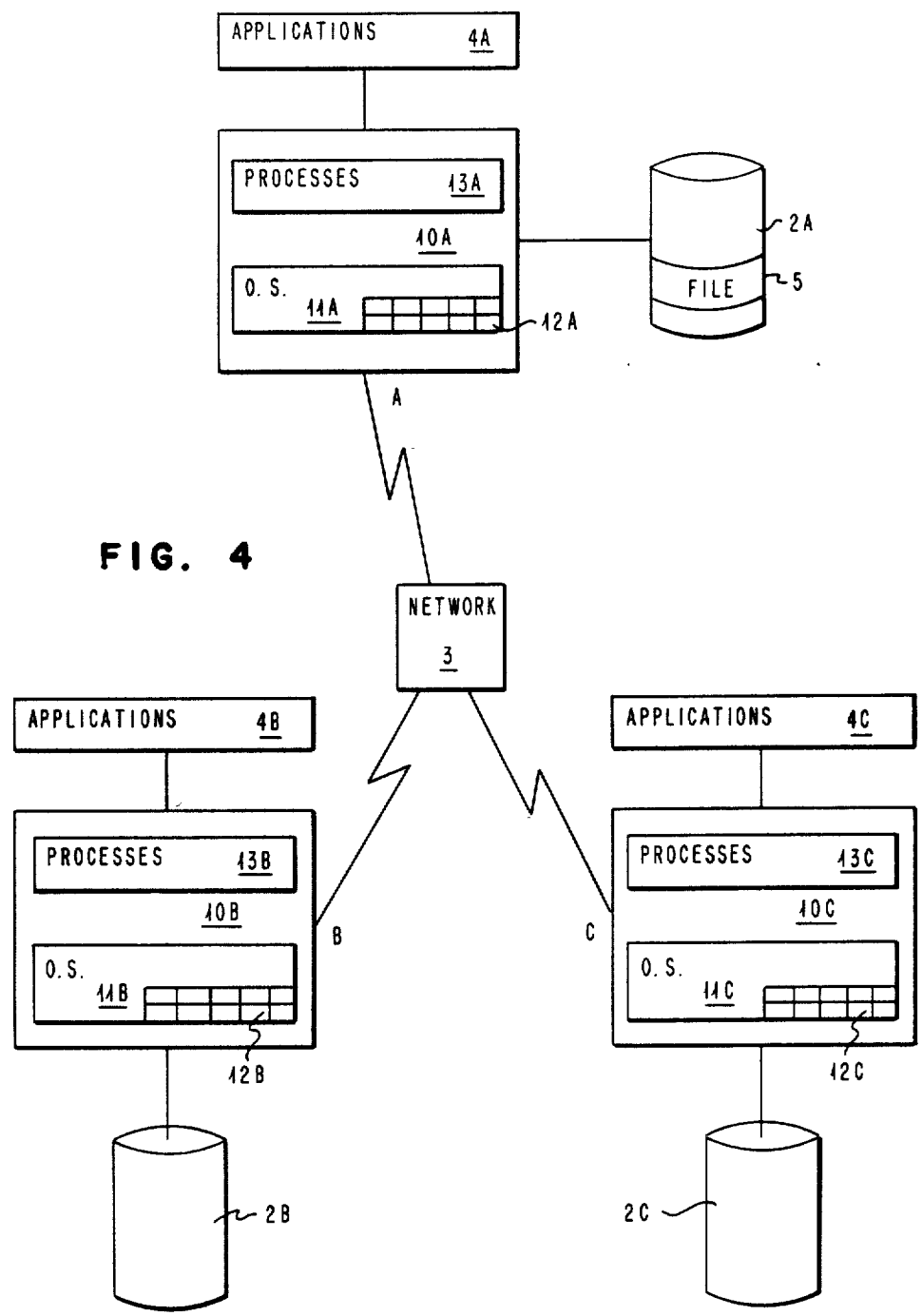
FIG. 4 shows three distributed processing systems connected in a network for accessing files across the network with client and server caches.

In the present invention as shown in FIG. 4, a local cache 12A, 12B, 12C, exists at every node A,B,C. If file 5 permanently resides at node A on disk 2A, node A is referred to as the server. At the server A, use of the cache 12A by local processes 13A executing at the server node A is as that in a stand-alone system as discussed above in the Background Art.

Figure 5:
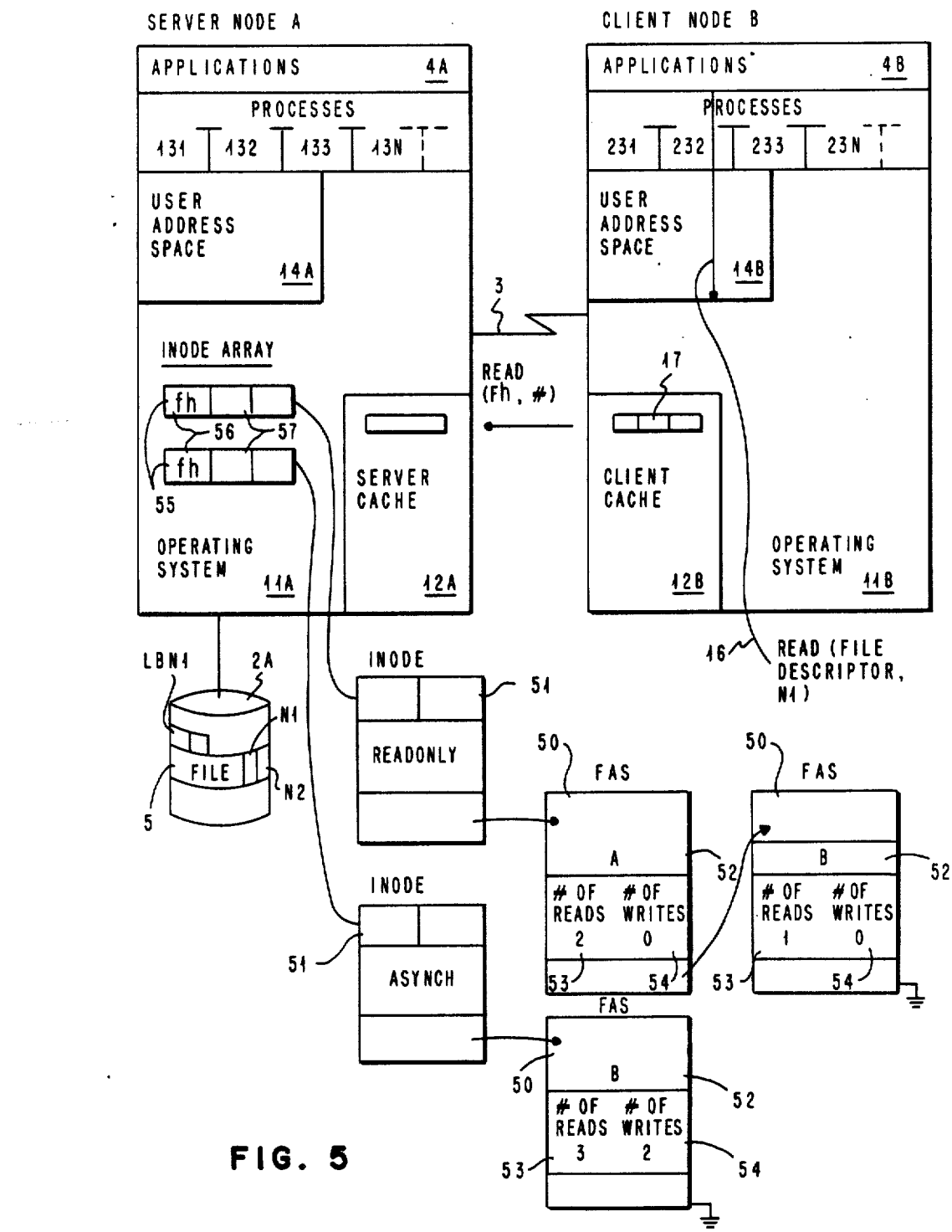
FIG. 5 shows a client and server node having client and server caches, respectively in READONLY or ASYNC synchronization mode.

However, remote processes 13B, 13C executing at nodes B, C, access the file 5 through a two step caching scheme using a server cache and a client cache as shown more clearly in FIG. 5. The server node A gets blocks of file 5 from disk 2A and stores it in the server cache 12A. Client node B goes out over the network 3 and gets blocks of file 5 from the server cache 12A. Client node B stores the blocks of the file 5 as it existed in the server cache 12A into the client cache 12B. When the user address space 14B of client node B seeks data from file 5, in ASYNCH or READONLY sync mode, the client cache 12B is accessed instead of going across the network 3 for each access. Using the client cache 12B to access a remote file 5 can significantly improve the performance since it can save network traffic and overhead.

The use of the client cache 12B and server cache 12A are managed in a distributed environment to achieve high performance while preserving the file access semantics at the application program level. This allows existing programs which run on a stand-alone system to run on a distributed system without any modification.

The file access semantics preserves a file's integrity as it is being opened by different processes that issue read and write system calls to access and modify the file. The file access semantics require that only one I/O operation is allowed on any byte range at any time, and once an I/O operation starts, it cannot be pre-empted by any other I/O operation to the same byte range of the file.

An example of this is given by referring again to FIG. 5. If process 131 issues a write system call to a byte range N1-N2 in file 5, the write system call can only be executed when the entire byte range N1-N2 is available for access by process 131, and no read operation involving the byte range N1-N2 is being executed. During the execution of the write system call, all other operations involving the byte range N1-N2 in file 5 are suspended until the write is completed. The write is not completed until the bytes are written to the local cache 12A. When a write request is complete, the written data in the cache 12A is visible to any subsequent read operation by any of the other processes 131-13N.

Another requirement of file access semantics is that when a file byte range such as N1-N2, which can be a record or a set of related records accessed by the same I/O operation, is visible to a reading process, the file byte range N1-N2 must always have a consistent set of data reflecting the last update to this range. This range is never available for access while a write operation is being executed. In this way the next read issued by a process will read the data just written and not the old outdated data.

In a distributed networking environment of this invention as shown in FIG. 5, the execution of read and write system calls from different application synchronized such that the file access semantics as discussed above are preserved. Synchronization is guaranteed by utilizing various cache synchronization (sync) modes. For a specific file 5, the I/O calls are synchronized by either the client B or the server A depending on the location of the processes 131-13N, 231-231N which have the file 5 open for access, and the sync mode.

The three synchronization modes are shown in FIG. <6, and are described with reference to FIG. 4. The first mode 41 is referred to as ASYNCH s_mode, or asynchronous mode. The file 5 operates in this mode 41 if the file 5 is open for read/write access by processes 13C executing at only one client remote node C, as shown in block 44, FIG. 6. In this mode 41, all of the control is in the client node C. Both the server cache 12A and client cache 12C are used for these read/write operations. A read or write operation requires access to the server cache 12A only if it cannot be satisfied from the client cache 12C. Modified blocks at the client 12C are written to the server 12A by the periodic sync operation, or when the file 5 is closed by all processes 13C in the client node C, or when a block must be written in order to make room for other data being brought into the cache. Additionally, modified blocks are written to the server when the file changes from ASYNCH s_mode to FULLSYNC s_mode.

A second mode 42 is READONLY s_mode. The READONLY s_mode 42 is used for files 5 that are open for read only access from processes 13C in only one node C, or from processes 13B, 13C in more than one node B, C, as shown in block 45, FIG. 6. In this mode 42, the server cache 12A and the client caches 12B and/or 12C are used. The read request is issued for a block or more at a time. Every other read request from the same client, either B or C, to the specific block does not go to the server 12. Instead, it is read from the respective client cache, either B or C. In other words, a read operation does not require access to the server 12A if it can be satisfied from the client cache 12C or 12B. In summary, the file 5 operates in mode 42 if the file 5 is open for read only access by any of the processes 13A, 13B, 13C, in any of the nodes A,B,C.

A third mode 43 is FULLSYNCH s_mode. The FULLSYNC s_mode 43 is used for files 5 open for write access by a process 13A in the server node A, as shown by block 48, FIG. 6. This sync mode 43 is also used if the file 5 is open in the server node A and at least one other node B, C, and at least one process 13A, 13B, or 13C has the file 5 open for write access, as shown by blocks 46,47, FIG. 6. In general, if more than one node has the file open, and any one of those nodes has the file open for write access, the file is in FULLSYNC s_mode. In the FULLSYNC s_mode 43, the client cache 12C or 12B is bypassed, and only the server cache 12A is used. All read and write operations are executed at the server 12A.

Figure 6:
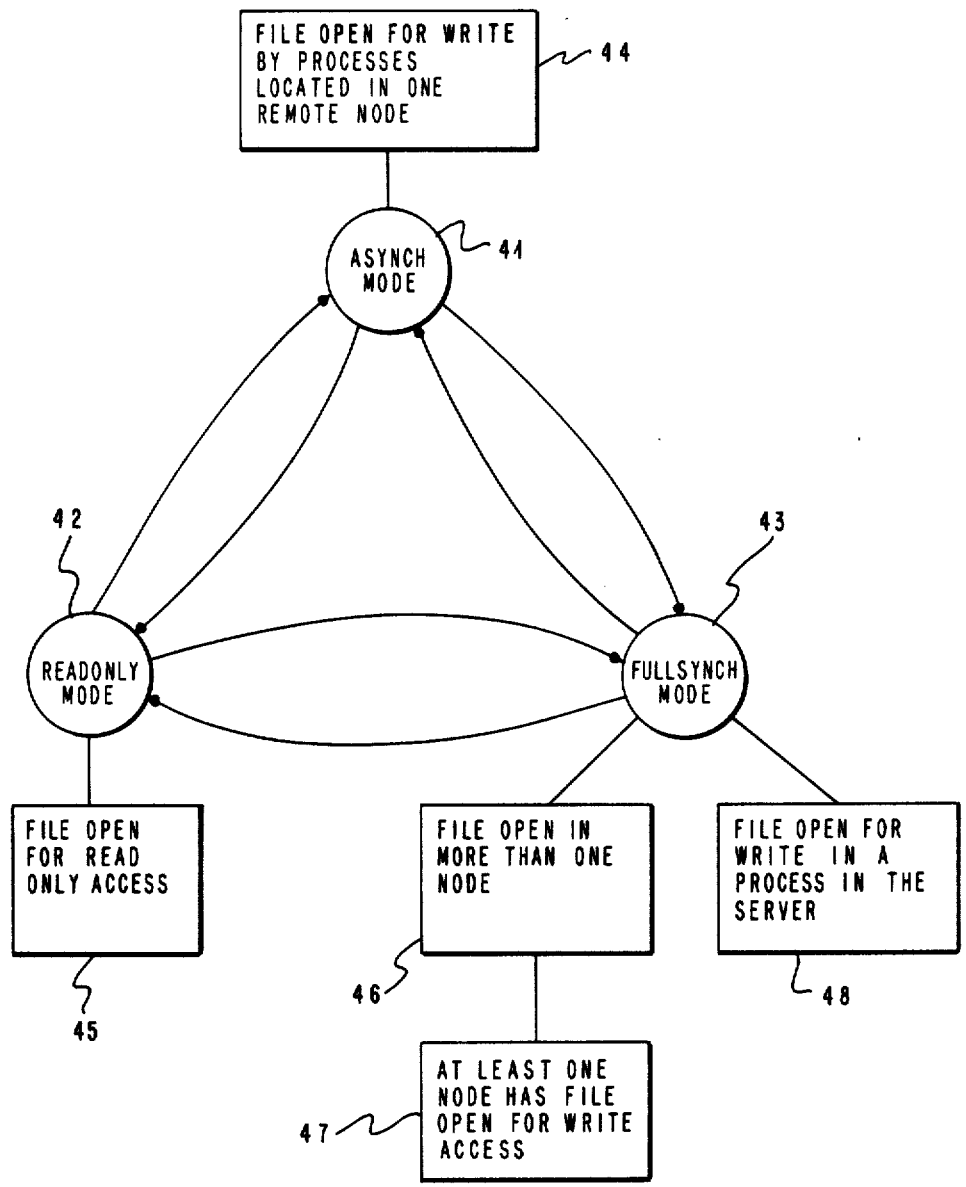
FIG. 6 shows the three synchronization modes used for managing the use of client and server caches in a distributed networking environment.

In a distributed environment 1 FIG. 4, most files 5 will more frequently be open for read only by processes 13A, 13B, 13C, at several nodes A, B, C in the READONLY s_mode 42, FIG. 6, or open for update at only one node in the Asynchronous s_mode 41, FIG. 6. It will be less frequent that there will be an open for read and write access by processes executing at more than one node in the Fullsync s_mode 43, FIG. 6. In both the READONLY s_mode 42, FIG. 6, and the ASYNCH s_mode 41, FIG. 6, the use of a client cache 12B, FIG. 5, significantly reduces the remote read/write response time of accessing file 5, and improves the overall system performance.

Figure 8:
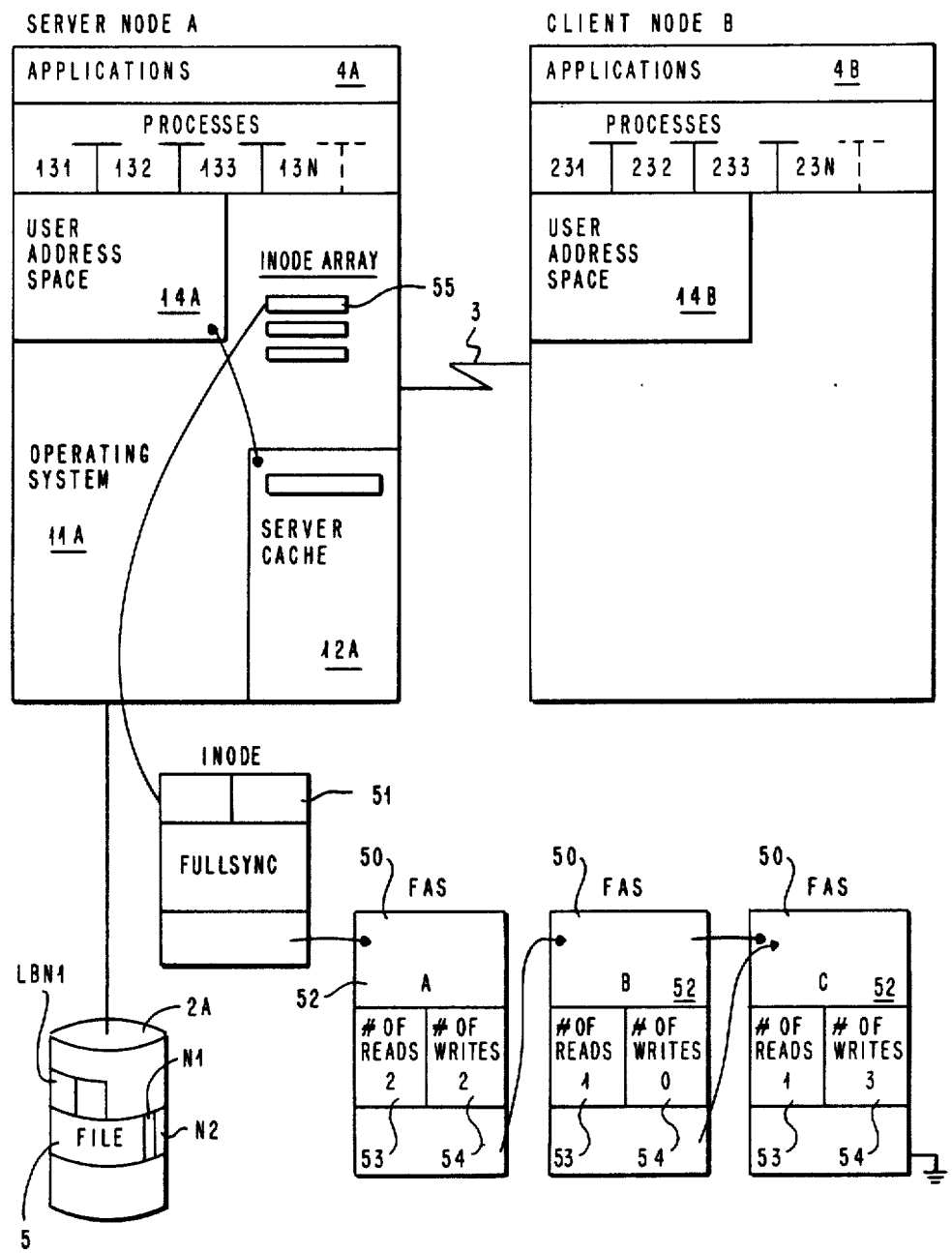
FIG. 8 shows a client accessing a file at the server in FULLSYNC s_mode.

As shown in FIG. 8, in the FULLSYNC s_mode, the client cache is not used. The client node B accesses the file 5 from the server A over the network 3 for each read and write. Although the read/write response time increases in this_mode, the file access semantics are preserved since a client does not retain a file 5 in a local cache that has not been updated along with the corresponding file residing at the server.

Utilizing the three modes to manage the use of the client cache optimizes overall system performance by combining both an overall average increase in read/write response speed with file integrity. Using a client cache in some situations, decreases the read/write response time; while not using a client cache in other situations preserves the file system semantics.

A file's sync mode is not only dependent on which nodes have the file open, and whether the file is open for read or write, but also on whether the device where the file resides is open in raw access_mode. Raw access for a device means that a block of data LBN1, FIG. 5, within a device 2A is accessed. In this way, the reads and writes of the device 2A read and write to a block LBN1 of device 2A. It is not relevant to which file the block belongs to. The device 2A can be opened for raw access from a process 131–13N at the server node A. It can't be opened for raw access from a remote node B, C.

Figure 1:
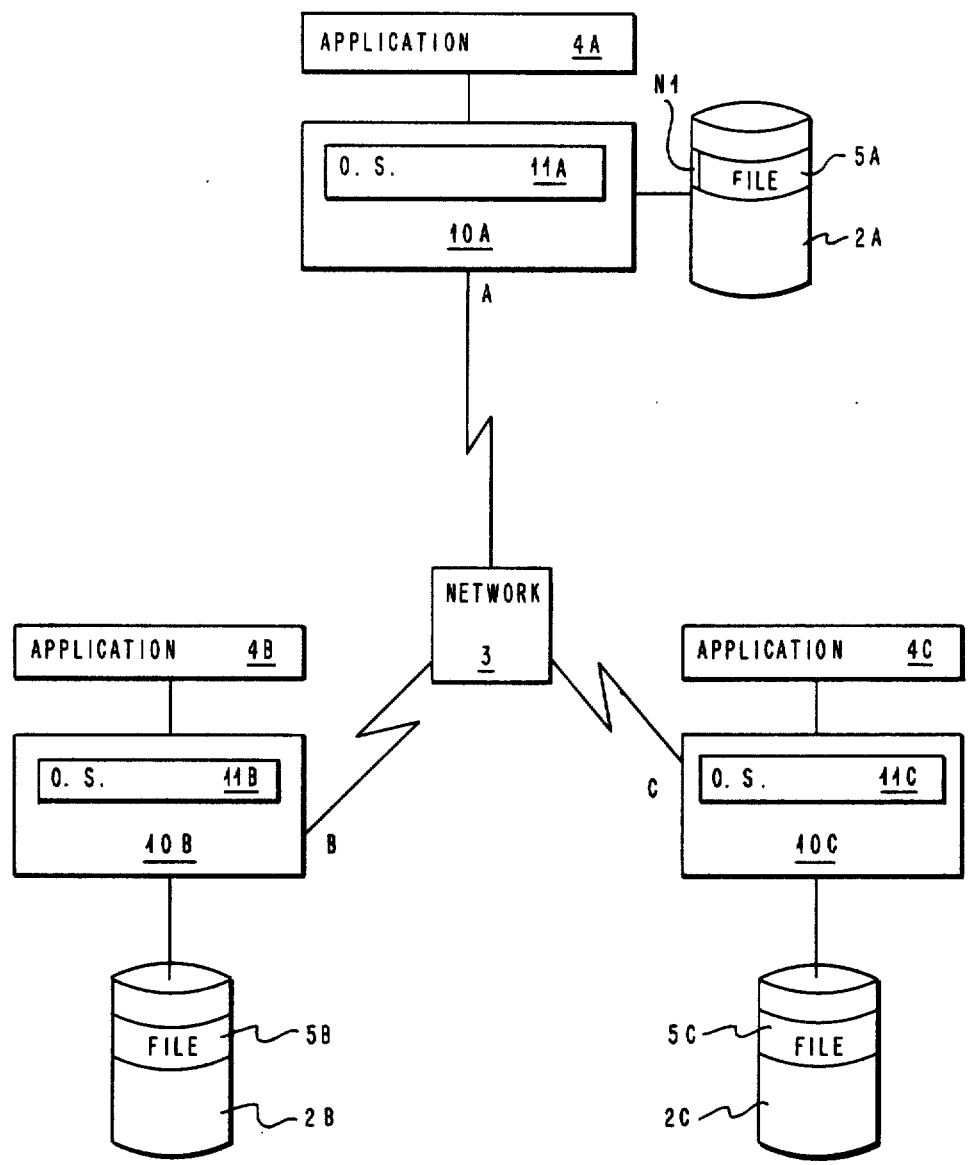
FIG. 1 shows three processing systems connected in a networking environment as known in the art.
Figure 2:
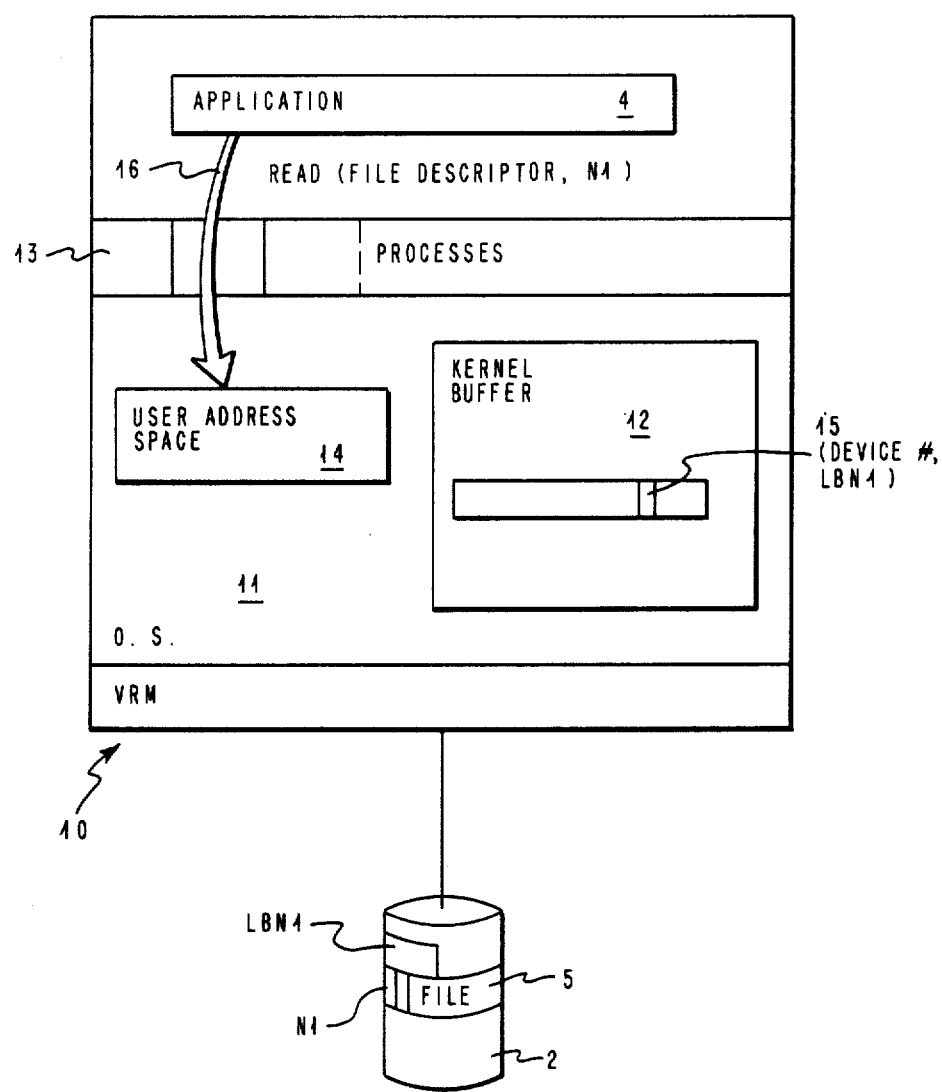
FIG. 2 shows a stand-alone processing system using a kernel buffer as known in the art.
Figure 3:
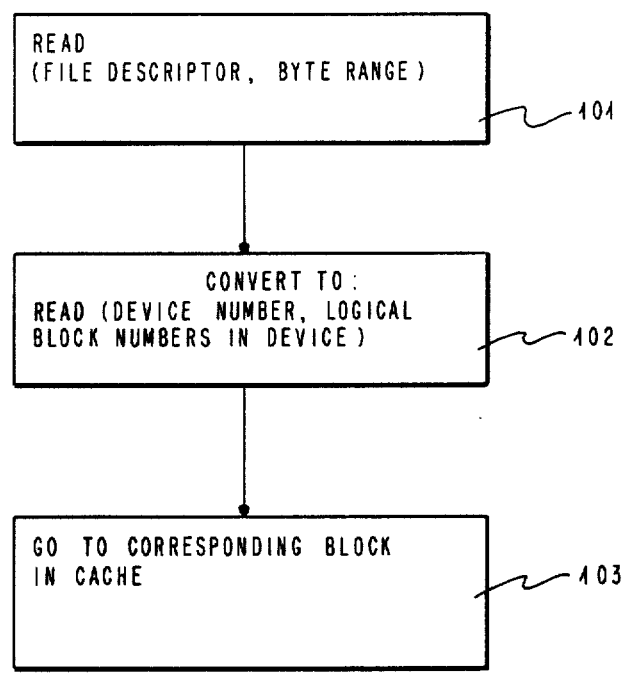
FIG. 3 shows a flow chart of a read to the kernel buffer in a stand-alone system as known in the art.

In reference to FIG. 5, the cache 12A is managed as blocks LBN1 of a device 2A, similar to a stand-alone system as described above with reference to FIG. 2. The server A looks at the server cache 12A as a logical block LBN1 within a device 2A. The client B has no knowledge of where the file 5 resides on the device 2A. All that client B knows is that it accesses a file 5 on block number N1 on device 2A. The client cache 12B handles the data as logical blocks N1 of files 5. In the server cache 12A, the data is handled as logical blocks LBN1 of devices 2A. In handling the data this way, the server can guarantee that if data is written to the device as a raw device, and if there is another read of a block of the file that happens to be the same block that was written to the device, then the read would see the newly written data. This preserves the file system semantics.

Figure 9:
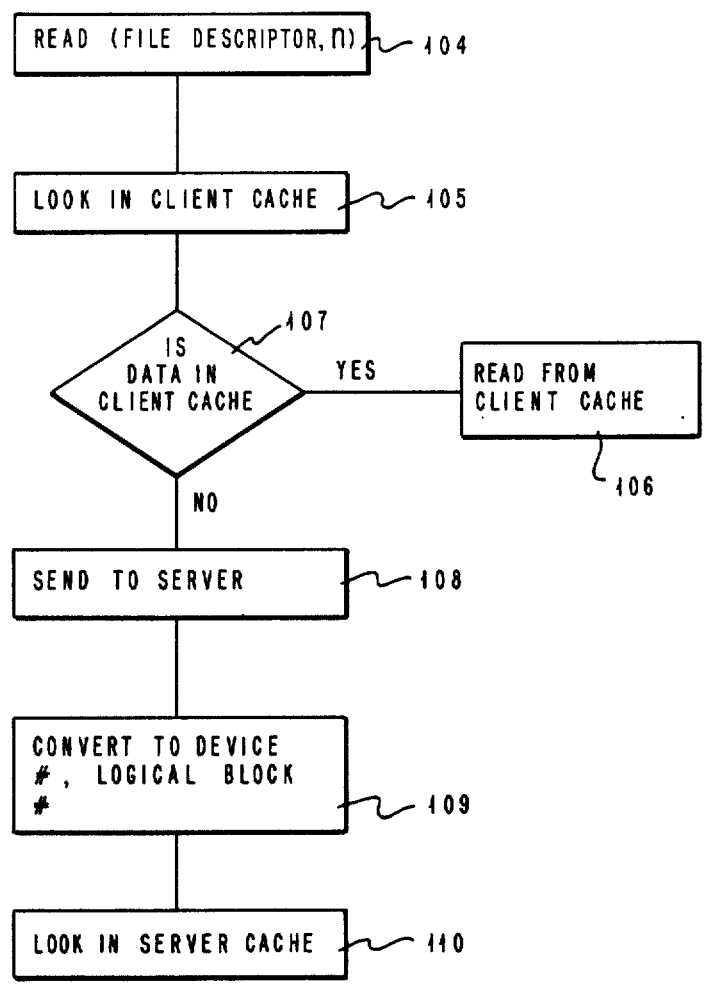
FIG. 9 shows the steps during a read when a client cache is used, and when the client cache is not used.

If the file is being accessed in a client node B, and the file is in ASYNC or READONLY mode, as shown in FIG. 5, the client operating system 11b does not convert the file descriptor and byte range within the file in the system call READ (file descriptor, N1) 16 to the device number and the logical block number in the device. The client does convert the file descriptor and byte range to a file handle, node identifier, and logical block number within the file. In the client cache 12B, there are blocks 17 that are designated by file handle, node identifier, and logical block number within the file. When a read 16 is issued from a client application 4B, step 104, FIG. 9, the request for the read goes to the operating system 11B with the file descriptor and the byte range within the file. The operating system then looks in the client cache 12B, step 105, FIG. 9. If the file handle, node identifier, and logical block number within the file is there, the cache 12B is read, step 106, FIG. 9. If it isn't there, step 107, FIG. 9, the read is sent to the server, step 108, FIG. 9. The server then takes the file handle and the logical block number within the file and converts it to a device number and logical block in the device, step 109, FIG. 9. This conversion is necessary since the server cache 12A is managed by device number and block number within the device as it is in a stand-alone system. After the read is sent to the server, it is handled the same as if the read was coming from its own application in a stand-alone system as described above with reference to FIG. 2.

Figure 7:
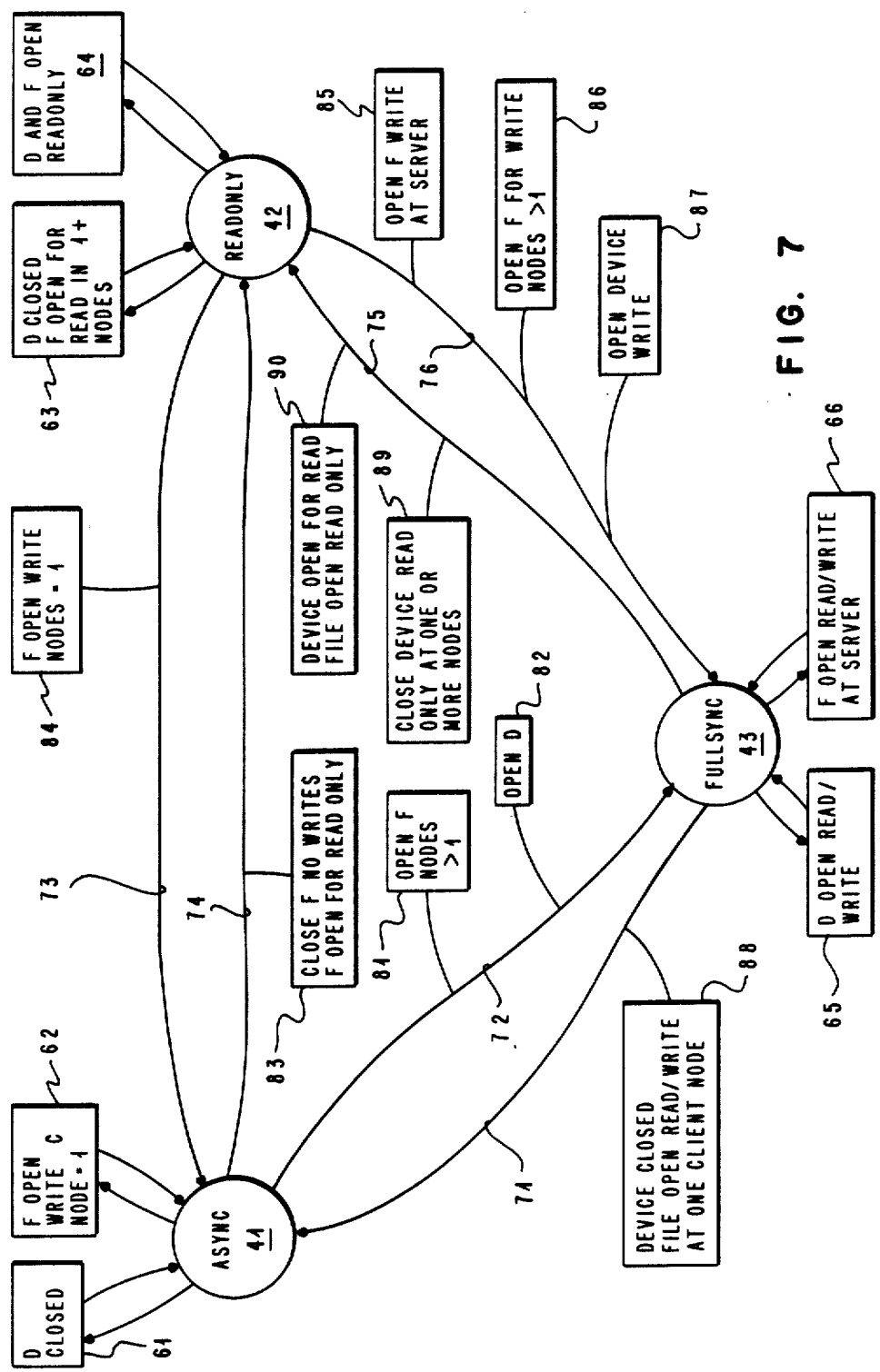
FIG. 7 shows the transitions between the three synchronization modes.

A closed file does not have a synchronization mode. However, once a file is first opened by a process, the file's sync mode is initialized according to the following as illustrated in FIG. 7.

The sync mode for a file is initialized to ASYNCH 41 if the device (D) where the file resides is closed 61, i.e., it is not open as a special device, and the file is open for write access at one remote node 62.

The sync mode for a file is READONLY 42 if the device where the file resides is closed, and the file is open for read only access in one or more nodes 63, or both the device and the file are open for read only access 64.

The sync mode for a file is initialized to FULLSYNCH 43 if the device where the file resides is open as a block special device for read/write access 65, or the file is open in more than one node and at least one of the opens is for writing. A block special device means that there is a raw access to the device.

Once a file is initialized to a mode, if the conditions change, the file mode may change. Transitions from one mode to another, as shown by lines 71–76 in FIG. 7, may occur under the following conditions.

If a file is presently in ASYNC mode 41, and the number of nodes where the file is open becomes two or more, 81, then the sync mode changes to FULLSYNC 43 as shown via line 72, FIG. 6. Also, if there is an open of the block special device D where the file resides, 82, the sync mode will change from ASYNC 41 to FULLSYNC 43. In a close operation for the file, if the close operation is not the last close of the file, and the file is still open for write, there is no mode change. However, if the close operation is the last close of the file for write access such that all the remaining opens are for read access, 83, then the new mode becomes READONLY 42 as shown via line 74. If the close operation is the last close of the file, then there is no sync mode.

If a file is presently in READONLY s_mode 42 and there is a file open operation, there will not be a mode change if the open is for read. However, if the open is for write, then the new sync mode is ASYNC 41 if all the opens are in one client node, 84 as shown via line 73. Otherwise, the sync mode is FULLSYNC. Furthermore, if the device where the file resides is open for read/write access, 87, the new sync mode for the file is FULLSYNC mode 43. For a close operation, if the close is the last close of the file, there is no sync mode for the file. If the file is still open at one or more nodes after a close operation, there is no change to the sync mode.

If a file is presently in FULLSYNC mode 43 and there is another open for the file, or the device where the file resides is opened, there is no sync mode change. If after a close operation of the file, there remains an open for read/write access at one remote node, and the block special device where the file resides is not open, the sync mode is changed to ASYNC s_mode 41, as shown by block 88 via line 71. The sync mode is changed from FULLSYNC 43 to READONLY 42 if the block special device where the file resides is not open, and the file is open for read only access at one or more nodes as shown by block 89 on line 75, or if the block special device where the file resides is open for read only access and the file is open for read only access as shown in block 90 on line 75.

All open and close operations for files and devices are resolved at the server node. The server determines the sync mode of an open file when executing any operation that may change the mode. The server also performs the change of the synchronization modes. As the server gets new opens or closes for the file, a change in synchronization modes for the file may be triggered. If the required sync mode is not the current one, the server sends a "change sync mode" remote procedure call (rpc) to all the clients with the file open.

After a file is opened for the first time, the client that opened the file is informed of the mode of the file. If the mode is either ASYNC or READONLY, the client can start using the client cache for reads, and also for writes if the mode is ASYNC, as shown in FIG. 5. The client does not have to read or write over the communications link to the server. If the mode is FULLSYNC as shown in FIG. 8, the client cache is not used, and the client must send the read or write over the communications link 3 to the server.

The server A, FIG. 5, always sets the mode 51 of the file 5. The server A also knows which nodes have the file open, and whether the opens are for reads or writes. The server A doesn't have to know which processes 131-13N, 231-23N within a node have a file open. The server keeps all the above information in a file access structure 50, which contains the sync mode 51, a list of nodes which have the file open 52, the number of reads 53, and the number of writes 54 to a file 5.

The file access structure 50 is linked to the inode 55. The inode 55 contains the file header 56 which identifies a file 5. The inode 55 also contains a block 57 containing information as to which device the file resides, and a block 58 containing information as to where on the device the file resides.

The inode 55 also contains two time bits 111, 112. Time bits are used in the inode 55 to assist in keeping track of information about the file. The time accessed bit 111 designates that the file or data was read. The time changed bit 112 indicates that the data or file has been modified by a write access.

When the time changed bit 112 is set, and any of the following three events occur, the actual time at the server A and the modified data in the server cache 12A will be written to the disk 2. The three events include checking the stats of a file, closing a file, or a periodic sync. A periodic sync writes the cache to the disk periodically, such as every minute. When the server time and the data in the server cache 12A are written to the disk 2, the time changed bit 112 is reset.

If there is a request to check the status of a file, the server A checks to see if the file is open, and by checking the inode bits, if the time change bit 112 is set, the new time indicating the time of the status request is written, and the status is returned. After this, if a request for status is issued, the requestor will receive the time indicating the time of the file change. The time change bit 112 will not change for the next status requests.

The file modification time as set above is used by the client B as an indication that the file 5 was changed after the client-B closed the file 5. When a client B closes a file, the server rids itself of the file access structure 50 for that closed file 5 if it was the last close. If another node has the file open, while the file is closed at node B, the file access structure 50 only has information on the open node in block 52. In other words, once node B closes a file, the server A does not retain any information that indicates that node B had the file 5 open previously.

As discussed above, a file may be open for read only access by processes executing at several client nodes, B, C, and server node A (i.e. READONLY synchronization mode); or the file may be open for read and write by processes in only one client node B (i.e. ASYNC synchronization mode). In either case, the client cache in each client node potentially has valid blocks of the file. If the file is closed by all processes at the client B, the blocks at client B should not be automatically invalidated. By keeping the blocks of data available in client B, if the file is to be re-opened by any process in node B, no remote read needs to be issued to the server A for this data.

The system and method of this invention gives the client node B a means for determining whether or not a file has been written to at another node during the time that the client node B had closed the file 5. A client B may use the file blocks in the client cache only if no write operations to the file occurred while the file was closed at the client B. If the client node B re-opens the file, and the file has not been changed while it has been closed at client node B, then the client node B can access the file 5 directly from the client cache 12B. If the client node B re-opens the file 5, and the file 5 has been changed while the file has been closed at client node B, then the client node B must go over the network 3 to the server to get the changed file 5. The changed file is then stored in the client cache 12B for further accessing.

Figure 10:
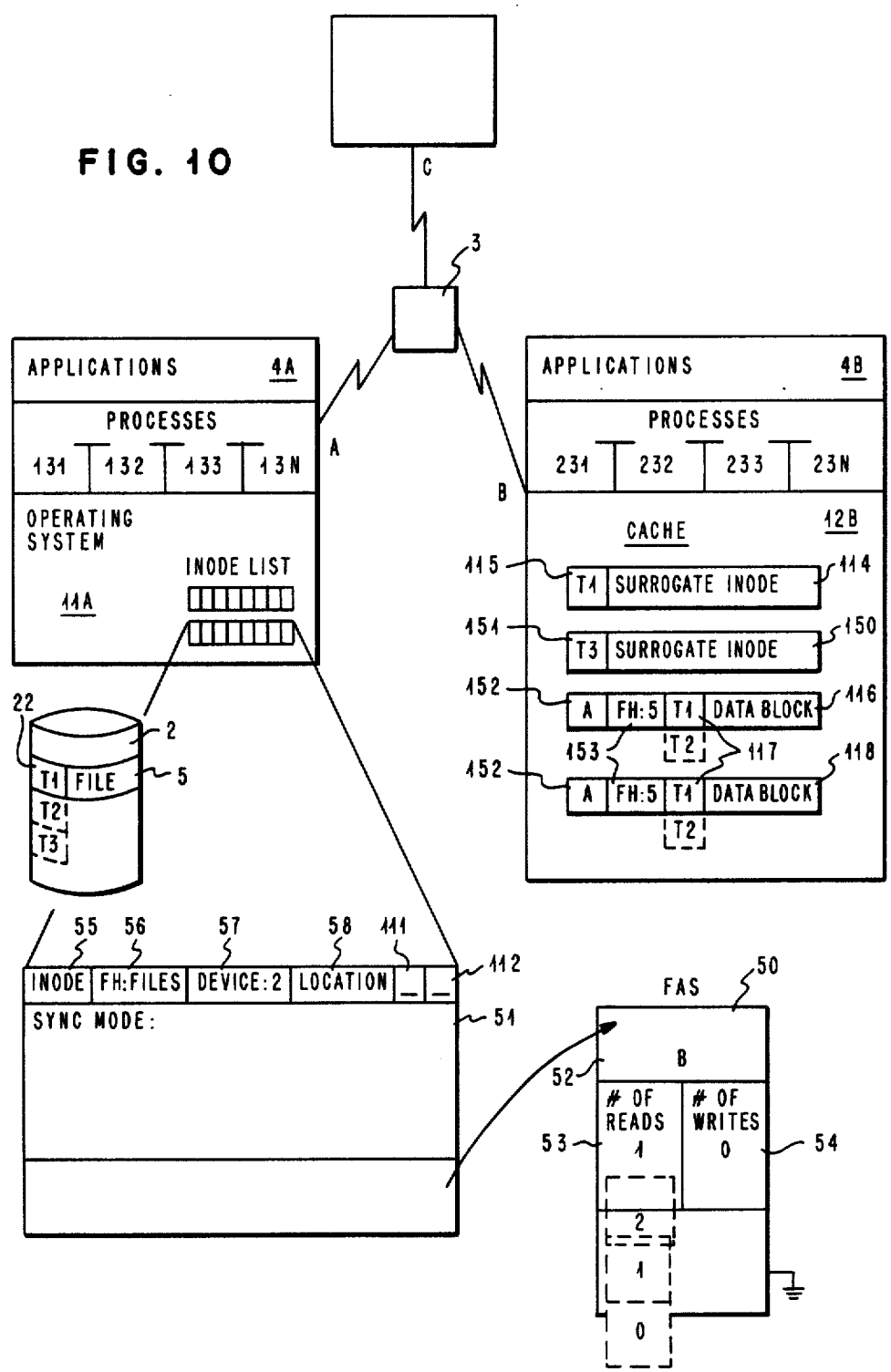
FIG. 10 shows a distributed networking environment wherein the client cache has a surrogate inode and time bits in the cache blocks for determining the validity of the data in the cache data blocks.

The system and method of this invention is best illustrated with reference to FIG. 10 and FIG. 11 concurrently. If a file 5 is opened for the first time by a process 231 in client node B, step 120, the client node B creates a surrogate inode 114, step 121. A surrogate inode is similar to an inode except that it does not contain all of the information that an inode contains.

When an open for a remote file 5 is issued in a client B, the surrogate inode table in the client processing system is scanned for an existing surrogate inode for file 5. If none exists, then a new surrogate inode is allocated. An open remote procedure call is sent to the server from the client. When the open is complete at the server, an open acknowledgement from the server to the client will include the last modification time for the file 5. The last modification time 22 that was written to the server disk 2 for the file 5 is recorded at the newly allocated surrogate inode 114 in block 115 at client B, step 122. The modification time T1 recorded in block 2 and block 115 is the time at the server A and not the time at the client B. At the server node A, the file access structure 50 is updated in block 52 to show that the file is open at node B, step 123.

If a first read is then issued, a data block 116 in the client cache 12B is assigned, step 124. The first bit 152 in data block 116 identifies the server node A. The second bit 153 contains a file handle to identify the file 5. When a new cache block is allocated for a block in file 5, the modification time T1 from block 115 of the surrogate inode 114 is copied to the cache block header in bit 117 of data block 116. At the server node A, the file access structure 50 shows the number of reads to be 1 in block 53, step 125.

For a second open, step 126, from client node B, such as from process 232, no additional surrogate inodes 114 are created. Subsequent opens of file 5 at client B will use the previously allocated surrogate inode 114, and will not update the file modification time as recorded by the first open.

For a second read from any of the processes 231-23N in client node B that have file 5 open, another data block 118 in the client cache 12B is assigned, and the time T1 in block 115 of surrogate inode 114 is written into block 117 of the new data block 118, step 127. Correspondingly, the file access structure 50 at the server node A is updated to reflect two opens for read in block 53, step 128.

If process 231 in client node B closes the file 5, step 129, the close is sent to the server node A. The server A then decrements the use count indicating the number of reads in block 53, step 130. In this example, the count would go from 2 to 1.

For the last close, step 131, of the file 5 at the client node B, in this case the second close, the server A decrements the use count in the file access structure 50 such that there are no opens at node B. Block 53 and block 54 in the file access structure go to zero. When these blocks go to zero for a client node, the server knows that there was a last close, and removes the file access structure 50 for that client B, step 132. The server A sends a close acknowledge to the client B, step 133. Along with the acknowledgement, the server returns the last time when the file was modified as recorded at the server. If the file is in ASYNCH mode, the client cache is scanned, and for every cache block which has a file handle for the file 5, the modification time is updated using the time in the close acknowledgement. In essence, all the times in the data blocks 116, 118 are updated with the last time T2 in block 22 that was written to the device 2 for file 5, step 134. Also, with the last close at a client node B, the client node B releases the surrogate inode 114 that was created with the first open in step 121.

After the last close at the client, a process 231-23N at the client B may re-open the file 5, step 135. With this re-open, the client B creates a new surrogate inode 150 for file 5, and writes the last time T3 from the server in block 22 of device 2 to block 151 in the surrogate inode 150, step 136. If while the file was closed at client B, no other nodes A, C had changed the file 5, the time T3 on disk 2 would not have changed from the time T2 written from the disk 2 to the data blocks 116, 118 during the close acknowledge, steps 133, 134. However, if other nodes A, C had written to the file 5 while the file was closed at client B, the time T3 in block 22 on device 2 would be greater than the time T2 that had been written from the disk 2 to the data blocks 116, 118 during the close acknowledge of steps 133, 135.

Figure 11:
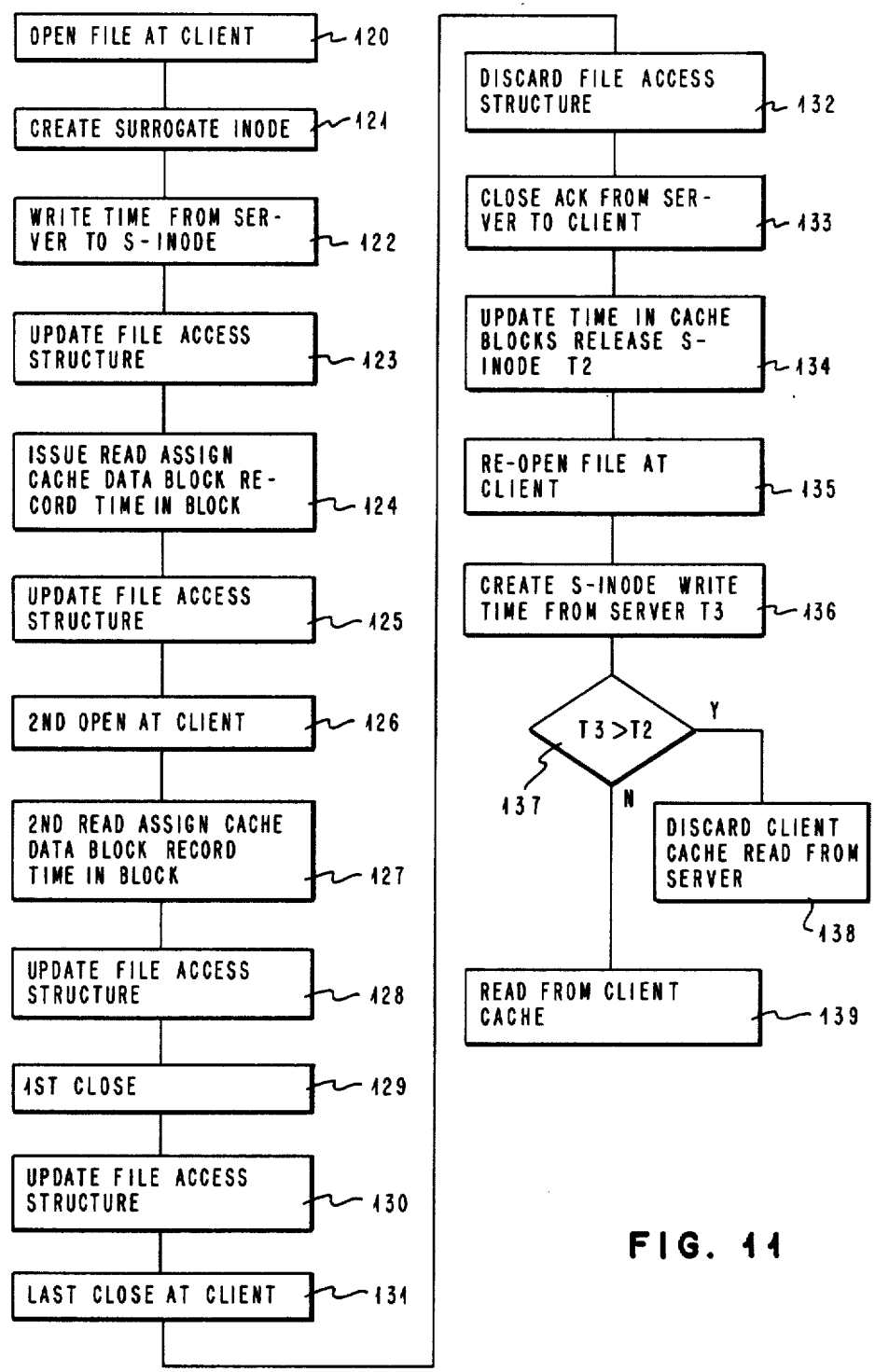
FIG. 11 shows the steps of the present invention during the opening, reading, and closing of the file at the client node.

As shown in decision block 137, FIG. 11, when a file is re-opened at a client node B, the time T3 that has just been written to the new surrogate inode 150 in block 151 is compared to the time T2 in block 117, 119 of the data blocks 116, 118, respectively. If the time T3 in the surrogate inode 150 is not equal to the time T2 in the data blocks 116, 118, then the data in the client cache data blocks cannot be used. The client B must access the server A over the network 3 and initiate the two step caching scheme: from the disk 2 to the server cache 12A to the client cache 12B. If the time T3 in the surrogate inode 150 is the same as the time T2 in the cache data blocks 116, 118, then the processes 231-23N in the client B can access the data directly from the client cache 12B without going across the network 3, step 139.

For a file in the ASYNC or READONLY synchronization mode, the client decides if the data in a specific cache block is valid based on the steps described above. To allow the client to make this decision, the header for each cache block contains the last modification time for the file according to the server's clock. The last modification time is recorded in the cache block when the block is read from the server, and updated at the time when the file is last closed at the client node. When an existing cache block is accessed for a reading (or to write a partial block), the modification time in its heading is compared to that in the surrogate inode. If the time in the surrogate inode is equal to that in the cache block, the data in the block is valid, and can be used by the client while preserving the file system semantics. If the time in the surrogate inode is not equal to the time in the cache block, then the data in the block is invalid and cannot be used by the client. The client sends a read remote procedure call to the server for that block of data.

The preferred embodiment can be summarized as follows. First, each surrogate inode has a file modification time field. Second, the client cache blocks have a file modification time field. Third, a client cache block is valid only if the cache block file modification time is equal to the surrogate inode file modification time. Fourth, surrogate inodes are created at a client upon an open of the file at the client when the file is not already open at the client.

Fifth, the surrogate inode file modification time field is assigned a value when either (1) a surrogate server, (2) a change sync mode request is received by the client, due to a change synch mode request from the server, (3)

a close at the client causes the file to go from asynch to read-only synch mode at the client, or (4) a close at the client causes the file to be no longer open at the client. Note, the surrogate inode file modification time is not changed when opens occur at the client that do not cause the surrogate inode to be created. This is because the file is already open at the client. Note also that conditions and 4) stated above could be replaced by the condition for each close of a file corresponding to an open of the file for writing.

The surrogate inode file modification time is assigned the value sent by the server in the open request of (1) above, or the change sync mode request in (2) above, or the close acknowledgement returned by the server to the client in (3) or (4) above. This value is the time the file was last modified as measured by the server.

Sixth, the client cache blocks for a file have their file modification time fields assigned a value when either (1) it is allocated due to a read of data from the server or a write by a client process to the file, or (2) a close occurs corresponding to the situations in (3) or (4) above. This value that is assigned to the cache block file modification time fields is the value found in the client's surrogate inode file modification time field. Note, immediately after the conditions mentioned above which cause the assignment of values to the cache block file modification fields, the file modification time fields for the cache blocks and the surrogate inode will be equal.

The system and method described above utilizes a client cache in the client processing system for buffering a file at a client node from the server processing system. The preferred embodiment determines the validity at the client processing system of the data blocks in the client cache by utilizing the time recorded at the server as measured by the server's clock. However, it will be understood by those skilled in the art that other embodiments may determine the validity at the server processing system of the data blocks in the client cache. However, other embodiments that use the server to keep track of the validity of the client's data blocks may use server resources that are more critical than the client's resources. Also, the server may be keeping track of data blocks in the client cache that may no longer reside in the client cache.

While the invention has been particularly shown and described with reference to a preferred embodiment, it will be understood by those skilled in the art that various changes in form and detail may be made without departing from the spirit and scope of the invention.

We claim:

1. A system for determining the validity of data residing in a plurality of blocks in a client cache, of a client data processing system at a client mode, from a file residing in a server data processing system at a server node, wherein said server data processing system and said client data processing system are connected by means of a communications link, said system comprising:
    means for determining, at the server node, a latest modification time of the file;
    means, in the client data processing system, for saving, corresponding to each of the blocks in the client cache, the latest determined modification time of the file, received from the server data processing system, when the file is closed at the client;
    means for recording, in the client data processing system, another determined latest modification time, received from the server data processing system, when said file is subsequently reopened at said client processing system; and
    means coupled to said saving means and said recording means for comparing, in the client data processing system, the latest determined modification time corresponding to one of said blocks with the recorded another determined latest modification time to determine the validity of said block.

2. The system of claim 1 wherein said one of the blocks of the file in the client cache is accessed if said another determined latest modification time in the client processing system is equal to the latest determined modification time corresponding to each of said blocks.

3. The system of claim 1 wherein the file is accessed from the server processing system if the another determined latest modification time is not equal to the latest determined modification time corresponding to each of said blocks.

4. The system of claim 1 wherein the blocks of the file in the client cache are discarded whenever the blocks are determined to be invalid.

5. A system for using cached data residing in a plurality of blocks in a client cache, of a client data processing system at a client node, from a file residing in a server data processing system at a server node, wherein said server data processing system and said client data processing system are connected by means of a communications link, said system comprising:
    first means for recording, at the server data processing system, a one last modification time for the file whenever the file at the server data processing system is modified;
    means for saving, in said client data processing system, said one last modification time, received from the server data processing system, for each of the cached data blocks for the file in the client cache when the file is closed at the client data processing system;
    second means for recording, in the client data processing system, another last modification time, received from the server data processing system, of the file at the server processing system, at a time of a subsequent reopen of the file in the client data processing system; and
    means coupled to said saving means and said second recording means for using at least one of the blocks of the file in the client cache if said using means determines that said saved one last modification time for each of said blocks is equal to the recorded another last modification time in the client data processing system.

6. A method for using cached data residing in a plurality of blocks in a client cache, of a client processing system at a client mode, from a file residing in a server processing at a server node, wherein said server processing system and said client processing system are connected by means of a communications link, said method comprising the steps of:
    recording by the client processing system a one last modification time, received from the server data processing system, of the file at the server processing system, for each of the cached data blocks in the client cache when the file is closed at the client processing system;
    recording by the client processing system another last modification time, received from the server processing system, of the file at the server processing system during a subsequent reopen of the file in the client processing system; and using at least one of the cached data blocks by a processing the client processing system if said process determines that said one last modification time for each of the at least one cached data blocks is equal to the another last modification time, of the file, recorded in the client processing system.

7. The method of claim 6 further comprising the step of accessing the file from the server processing system if the one last modification time and the another last modification time are not equal.

8. The method of claim 6 further comprising the step of discarding data in the cached data blocks when the last one modification time and the another last modification time are not equal.

9. A method for determining the validity of data residing in a cache block in a client processing system from a file residing in a server processing system, wherein the client processing system and the server processing system are connected by means of a communication link, said method comprising the steps of:

recording by the server processing system a latest modification time for the file at the server processing system whenever the file at the server processing system is updated;

recording by the client processing system the latest modification time, received from the server processing system, when the file in the client processing system is first opened;

allocating the cache block assigned to the file in the client cache in the client processing system when a block of the file is read from the server processing system;

recording by said client processing system the latest modification time recorded in the client processing system for each allocated cache block;

updating by said client processing system the latest modification time recorded in each said allocated cache block assigned to the file when the file is last closed at the client processing system; and comparing by said client processing system the latest modification time recorded in the client processing system a first reopen to the updated latest modification time for each said allocated cache block, to determine the validity of each said allocated cache block.

10. The method of claim 9 further comprising the step of using, by a process in the client processing system, the cached block if the latest modification time recorded in the client processing system is the same as the latest modification time for the cache block.

11. The method of claim 9 further comprising the step of accessing the file from the server processing system, by the client processing system, if the latest modification time recorded in the client processing system is different from the latest modification time for the allocated cache block.

12. The method of claim 9 further comprising the step of discarding the data in the client cache block if the latest modification time recorded in the client processing system at the first reopen is not equal to the time for the cache block.

13. The method of claim 9 further comprising the step of replacing the data in the cache block with current data from the server if the latest modification time recorded in the client processing system at the first reopen is not equal to the latest modification time for the cache block.

14. The method of claim 9 wherein the data is discarded at any time the client processing determines the said compared modification times are not equal.

15. A system for keeping a plurality of blocks of data in a client cache, from a file residing at a server processing system, available for use by a client processing system when the file is reopened after a close of the file at the client processing system, wherein the client processing system and the server processing system are connected by means of a communication link, said system comprising:

first means for recording, in each of the cached blocks in the client processing system, a one last modification time, received from the server processing system, of the file at the server processing system, when the file is closed at the client processing system;

second means for recording, in the client processing system, another last modification time, received from the server processing system, of the file at the server processing system, when the file is subsequently reopened at the client processing system;

means coupled to said first and second recording means for comparing the modification times in the client processing system and the cached blocks to determine if the data in the cache blocks remained unmodified at the server processing system while the file at the client processing system was closed; and means coupled to said comparing means for using the data from the cached blocks by a process in the client processing after the file is subsequently reopened in the client processing system if the compared modification times are equal.

16. A computer program having program code means for determining the validity of data residing in a plurality of blocks in a client cache, of a client data processing system at a client node, from a file residing in a server data processing system at a server node, wherein said server data processing system and said client data processing system are connected by means of a communications link, said computer program comprising:

first program code means, in the client data processing system, for causing a recording of correspondence between each of the blocks in the client cache and a latest determined modification time of the file, received from the server data processing system, when the file is closed at the client;

second program code means for causing a recording, in the client data processing system, of another determined latest modification time, received from the server data processing system, when said file is subsequently reopened at said client processing system; and third program code means for causing a comparison, in the client data processing system, between the latest determined modification time corresponding to one of said blocks and the recorded another determined latest modification time to determine the validity of said block.

* * * * *

UNITED STATES PATENT AND TRADEMARK OFFICE
CERTIFICATE OF CORRECTION

PATENT NO. : 4,897,781

DATED : January 30, 1990

INVENTOR(S) : Albert Chang, Grover H. Neuman, Amal A. Shaheen-Gouda and Todd A. Smith It is certified that error appears in the above-identified patent and that said Letters Patent is hereby corrected as shown below:

Col. 17, line 4, please delete "processing" (first occurrence) and insert --process in--;
      line 15, please delete "last one" and insert --one last--;
      line 44, after "system", please insert --at--; and
      line 62, before "time", please insert --latest modification--.

Signed and Sealed this

First Day of June, 1993

Attest:

MICHAEL K. KIRK

Attesting Officer    Acting Commissioner of Patents and Trademarks